United States Patent
Uchida et al.

(10) Patent No.: US 9,934,282 B2
(45) Date of Patent: Apr. 3, 2018

(54) COOKING RECIPE INFORMATION PROVISION DEVICE, COOKING RECIPE INFORMATION PROVISION METHOD, PROGRAM, AND INFORMATION RECORDING MEDIUM

(71) Applicant: RAKUTEN, INC., Tokyo (JP)

(72) Inventors: Yuki Uchida, Kohoku-ku (JP); Koichi Suto, Setagaya-ku (JP); Hitoshi Matsumoto, Kodaira (JP); Kazutoshi Ando, Setagaya-ku (JP)

(73) Assignee: Rakuten, Inc., Setagaya-ku, Tokyo (JP)

( * ) Notice: Subject to any disclaimer, the term of this patent is extended or adjusted under 35 U.S.C. 154(b) by 0 days.

(21) Appl. No.: 14/888,587

(22) PCT Filed: Nov. 6, 2013

(86) PCT No.: PCT/JP2013/080004
§ 371 (c)(1),
(2) Date: Nov. 2, 2015

(87) PCT Pub. No.: WO2015/068224
PCT Pub. Date: May 14, 2015

(65) Prior Publication Data
US 2016/0110423 A1    Apr. 21, 2016

(51) Int. Cl.
*G06F 17/30* (2006.01)
*G06Q 50/12* (2012.01)

(52) U.S. Cl.
CPC .. *G06F 17/30522* (2013.01); *G06F 17/30091* (2013.01); *G06F 17/30554* (2013.01); *G06F 17/30598* (2013.01); *G06Q 50/12* (2013.01)

(58) Field of Classification Search
CPC ......... G06F 17/30522; G06F 17/30554; G06F 17/30598; G06F 17/30705; G06F 17/30091; G06F 17/3028; G06Q 50/12
See application file for complete search history.

(56) References Cited

U.S. PATENT DOCUMENTS

2005/0192869 A1    9/2005  Maeda et al.
2009/0009815 A1*   1/2009  Karasik ............. G06F 17/30634
                                                        358/403

(Continued)

FOREIGN PATENT DOCUMENTS

JP    9-34945 A      2/1997
JP    2007-164727 A  6/2007
JP    2011-253312 A  12/2011

OTHER PUBLICATIONS

Communication dated Jun. 16, 2016 from the U.S. Patent and Trademark Office in counterpart U.S. Appl. No. 14/372,556.

(Continued)

*Primary Examiner* — Alexander Khong
(74) *Attorney, Agent, or Firm* — Sughrue Mion, PLLC

(57) ABSTRACT

A cooking recipe information provision device including a recipe name obtaining unit for obtaining a recipe name input by a user; a recipe extraction unit for extracting a plurality of recipes, based on the recipe name obtained from a recipe information database for storing a plurality of recipes, ingredients used in the respective recipes, and amounts of the respective ingredients so as to be correlated to each other; and a display data generation unit for extracting a recipe, based on the amount of the main ingredient, from among the plurality of recipes extracted, and generating display data indicating information on the extracted recipe.

8 Claims, 10 Drawing Sheets

| RECIPE | MAIN INGREDIENT | SET AMOUNT | | EVALUATION VALUE |
|---|---|---|---|---|
| PASTA | PASTA | FIRST | 0g OR OVER AND UNDER 50g | 1 |
| | | SECOND | 50g OR OVER AND UNDER 100g | 3 |
| | | THIRD | 100g OR OVER | 5 |
| HAMBURGER | MINCED MEAT | FIRST | 0g OR OVER AND UNDER 40g | 1 |
| | | SECOND | 40g OR OVER AND UNDER 80g | 3 |
| | | THIRD | 80g OR OVER | 5 |
| | ONION | FIRST | 0g OR OVER AND UNDER 20g | 1 |
| | | SECOND | 20g OR OVER AND UNDER 40g | 3 |
| | | THIRD | 40g OR OVER | 5 |

(56) References Cited

U.S. PATENT DOCUMENTS

| | | |
|---|---|---|
| 2009/0083327 A1 | 3/2009 | Ringham et al. |
| 2013/0138656 A1 | 5/2013 | Wheaton |
| 2013/0224694 A1 | 8/2013 | Moore et al. |
| 2014/0081955 A1 | 3/2014 | Osaki |
| 2014/0089299 A1 | 3/2014 | Kamei et al. |
| 2014/0095479 A1 | 4/2014 | Chang et al. |
| 2015/0269661 A1* | 9/2015 | Luke .................. G06Q 30/08 705/26.3 |

OTHER PUBLICATIONS

Notification of Reasons for Refusal for Japanese Patent Application No. 2014-518856, dated Jun. 10, 2014.
International Search Report of PCT/JP2013/080004, dated Dec. 10, 2013. [PCT/ISA/210].
Communication dated Nov. 8, 2016, issued by the U.S. Patent and Trademark Office in related U.S. Appl. No. 14/372,556.
An Office Action dated Mar. 22, 2017, which issued during the prosecution of U.S. Appl. No. 14/372,556.

* cited by examiner

| RECIPE | MAIN INGREDIENT | SET AMOUNT |
|---|---|---|
| PASTA | PASTA | 90g |
| HAMBURGER | MINCED MEAT | 80g |
| | ONION | 40g |
| STEWED MEAT AND POTATO | BEEF | 50g |
| ⋮ | ⋮ | ⋮ |

FIG.5A

| INGREDIENTS | | CLOSE |
|---|---|---|
| AMOUNT [____] PERSONS | | |
| INGREDIENT NAME | | AMOUNT |
| 31-1 [_____] | | [____] |
| 31-2 [_____] | | [____] |
| | | ADD |
| | STORE | |

FIG.5B

| INGREDIENTS | | CLOSE |
|---|---|---|
| AMOUNT [ 1 ] PERSONS | | |
| INGREDIENT NAME | | AMOUNT |
| 31-1 PASTA | | 100g |
| 31-2 CANNED TUNA | | 20g |
| 31-3 MAITAKE MUSHROOM | | 20g |
| 31-4 ERINGI MUSHROOM | | 20g |
| 31-5 SOY SAUCE | | DASH |
| 31-6 BUTTER | | TO TASTE |
| | | ADD |
| | STORE | |

FIG.6

| RECIPE ID | 00123 |
|---|---|

TITLE: BUTTER SOY SAUCE PASTA WITH TUNA AND MUSHROOM
DISH NAME: JAPANESE PASTA

INGREDIENTS (ONE PERSON)

| PASTA | 100g |
|---|---|
| CANNED TUNA | 20g |
| MAITAKE MUSHROOM | 20g |
| ERINGI MUSHROOM | 20g |
| SOY SAUCE | DASH |
| BUTTER | TO TASTE |

(RECIPE IMAGE)

COMMENT (TUG)

SHIITAKE MUSHROOM, CHEESE, EASY, APPETIZER, PASTA·····

DIRECTIONS FOR "BUTTER SOY SAUCE PASTA WITH TUNA AND MUSHROOM"

1. ············
   (DIRECTION IMAGE)

2. ············
   (DIRECTION IMAGE)

3. ············
   (DIRECTION IMAGE)

FIG.8

| | | |
|---|---|---|
| | PASTA  SEARCH | |
| 1 | (RECIPE IMAGE) | BUTTER SOY SAUCE PASTA WITH TUNA AND MUSHROOM<br>DISH NAME: JAPANESE PASTA<br>INGREDIENTS: PASTA, CANNED TUNA, MAITAKE MUSHROOM, ERINGI MUSHROOM, SOY SAUCE, BUTTER<br>TUG: SHIITAKE MUSHROOM, CHEESE, EASY, APPETIZER, PASTA<br>ID: 00123 |
| 2 | (RECIPE IMAGE) | COD ROE CREAM SOUP PASTA<br>DISH NAME: PASTA WITH SPRING CABBAGE AND PORK<br>INGREDIENTS: PASTA, THICK PIECE OF PORK, CABBAGE, GARLIC, SALT, PEPPER<br>TUG: EASY, MOTHER'S DAY, FATHER'S DAY, ANNIVERSARY, PORK LOIN<br>ID: 00089 |
| ⋮ | ⋮ | |

FIG.11

| RECIPE | MAIN INGREDIENT | SET AMOUNT | | EVALUATION VALUE |
|---|---|---|---|---|
| PASTA | PASTA | FIRST | 0g OR OVER AND UNDER 50g | 1 |
| | | SECOND | 50g OR OVER AND UNDER 100g | 3 |
| | | THIRD | 100g OR OVER | 5 |
| HAMBURGER | MINCED MEAT | FIRST | 0g OR OVER AND UNDER 40g | 1 |
| | | SECOND | 40g OR OVER AND UNDER 80g | 3 |
| | | THIRD | 80g OR OVER | 5 |
| | ONION | FIRST | 0g OR OVER AND UNDER 20g | 1 |
| | | SECOND | 20g OR OVER AND UNDER 40g | 3 |
| | | THIRD | 40g OR OVER | 5 |
| | | | | |

FIG.12

| RECIPE ID | EVALUATION VALUE |
|---|---|
| 00089 | 5 |
| 00095 | 5 |
| 00102 | 5 |
| 00123 | 3 |
| 00134 | 3 |
| 00156 | 3 |
| ⋮ | ⋮ |

COOKING RECIPE INFORMATION PROVISION DEVICE, COOKING RECIPE INFORMATION PROVISION METHOD, PROGRAM, AND INFORMATION RECORDING MEDIUM

CROSS REFERENCE TO RELATED APPLICATIONS

This application is a National Stage of International Application No. PCT/JP2013/080004 filed Nov. 6, 2013, the contents of all of which are incorporated herein by reference in their entirety.

TECHNICAL FIELD

The present invention relates to a cooking recipe information provision device, a cooking recipe information provision method, a program, and an information recording medium.

BACKGROUND ART

There has been known a technique for extracting, when a user inputs a name (a cooking recipe name) of its desired cooking receipt in a user terminal to search for the recipe, cooking recipes each including the cooking recipe name, and presenting to the user a search result page showing information on the cooking recipes extracted (for example Patent Literature 1). For example, in a case where a user inputs "pasta" as a cooking recipe name, a search result page showing information on a plurality of cooking recipes, for example, "cream pasta", "tomato pasta", each including the term "pasta" in its name or the like, are displayed in a user terminal.

CITED DOCUMENT LIST

Patent Literature

Patent Literature 1: Japanese Patent Laid-open Publication No. 2007-164727

SUMMARY OF INVENTION

Technical Problem

However, according to the related art, there is a problem that various cooking recipes, including one with the cooking recipe name inputted by a user included in the dish name and ingredient thereof and one with the same included only in the ingredient thereof but not in the dish name thereof, are extracted, and that a cooking recipe not desired by the user may be displayed in a higher rank order on the search result page. For example, in a case where a cooking recipe "hamburger" includes "pasta" as an ingredient of a side dish (trimmings) and a user inputs "pasta" as a cooking recipe name, information on the cooking recipe "hamburger" may be displayed in a higher rank order on the search result page. In this case, however, "hamburger" is not necessarily a cooking recipe desired by the user.

The present invention has been conceived in view of the above mentioned problem, and an object of the present invention is therefore to provide a cooking recipe information provision device, a cooking recipe information provision method, a program, and an information recording medium capable of appropriately displaying a cooking recipe desired by a user.

Solution to Problem

In order to achieve the above described object, a cooking recipe information provision device according to the present invention includes a recipe name obtaining unit for obtaining a cooking recipe name inputted by a user; a recipe extraction unit for extracting a plurality of cooking recipes, based on the cooking recipe name obtained by the recipe name obtaining unit, from a storage unit for storing a plurality of cooking recipes, ingredients used in the respective cooking recipes, and amounts of the respective ingredients so as to be correlated to each other; and a display data generation unit for extracting a cooking recipe, based on the amount of a main ingredient that is a main ingredient used in a cooking recipe corresponding to the cooking recipe name obtained by the recipe name obtaining unit, from among the plurality of cooking recipes extracted by the recipe extraction unit, and generating display data indicating information on the extracted cooking recipe.

A cooking recipe information provision method according to the present invention is a cooking recipe information provision method to be executed by a computer, including a recipe name obtaining step of obtaining by the computer a cooking recipe name inputted by a user; a recipe extraction step of extracting by the computer a plurality of cooking recipes, based on the cooking recipe name obtained at the recipe name obtaining step, from a storage unit for storing a plurality of cooking recipes, ingredients used in the respective cooking recipes, and amounts of the respective ingredients so as to be correlated to each other; and a display data generation step of extracting by the computer a cooking recipe, based on an amount of a main ingredient that is a main ingredient used in a cooking recipe corresponding to the cooking recipe name obtained at the recipe name obtaining step, from among the plurality of cooking recipes extracted at the recipe extraction step, and generating by the computer display data indicating information on the extracted cooking recipe.

A program according to the present invention is a program for causing a computer to function as a recipe name obtaining unit for obtaining a cooking recipe name inputted by a user; a recipe extraction unit for extracting a plurality of cooking recipes, based on the cooking recipe name obtained by the recipe name obtaining unit, from a storage unit for storing a plurality of cooking recipes, ingredients used in the respective cooking recipes, and amounts of the respective ingredients so as to be correlated to each other; and a display data generation unit for extracting a cooking recipe, based on an amount of a main ingredient that is a main ingredient used in a cooking recipe corresponding to the cooking recipe name obtained by the recipe name obtaining unit, from among the plurality of cooking recipes extracted by the recipe extraction unit, and generating display data indicating information on the extracted cooking recipe.

An information recording medium according to the present invention stores a program for causing a computer to function as a recipe name obtaining unit for obtaining a cooking recipe name inputted by a user; a recipe extraction unit for extracting a plurality of cooking recipes, based on the cooking recipe name obtained by the recipe name obtaining unit, from a storage unit for storing a plurality of cooking recipes, ingredients used in the respective cooking recipes, and amounts of the respective ingredients so as to be correlated to each other; and a display data generation unit for extracting a cooking recipe, based on an amount of a main ingredient that is a main ingredient used in a cooking recipe corresponding to the cooking recipe name obtained by the recipe name obtaining unit, from among the plurality of cooking recipes extracted by the recipe extraction unit, and generating display data indicating information on the extracted cooking recipe.

Advantageous Effects of Invention

According to the present invention, information on a cooking recipe extracted based on the amount of a main ingredient is provided to a user. This makes it possible to appropriately display a cooking recipe desired by a user.

BRIEF DESCRIPTION OF DRAWINGS

FIG. 5A shows an example of an ingredient registration screen displayed.

FIG. 5B shows an example of an ingredient registration screen displayed.

FIG. 6 shows an example of a recipe page displayed.

FIG. 8 shows one example of a search result page.

FIG. 11 shows one example of an ingredient DB according to the second embodiment.

FIG. 12 shows one example of an evaluation value list.

DESCRIPTION OF EMBODIMENTS

First Embodiment

Figure 1:
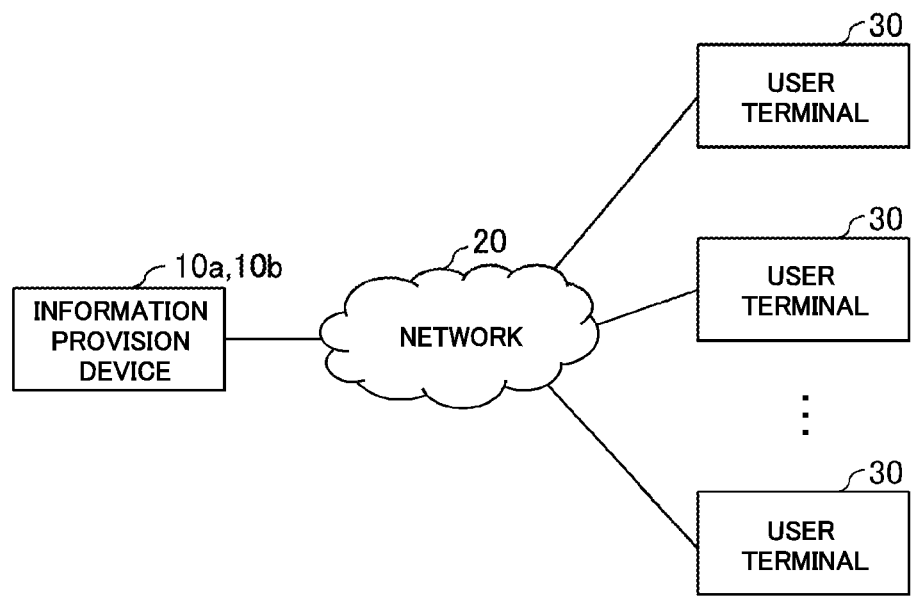
FIG. 1 shows a configuration of a cooking recipe information provision system according to this embodiment.

A first embodiment of the present invention will be described referring to the drawings.

FIG. 1 shows one example of a schematic configuration of a cooking recipe information provision system according to a first embodiment of the present invention. As shown in the drawing, the cooking recipe information provision system includes an information provision device 10a (a cooking recipe information provision device) for providing information on a cooking recipe (hereinafter referred to as a recipe), and a plurality of user terminals 30 connected to the information provision device 10a via a communication network 20. The information provision device 10a and each user terminal 30 mutually exchange data via the communication network 20 such as the Internet or the like. In the cooking recipe information provision system, for example, when a user inputs the name (a recipe name) of its desired recipe in the user terminal 30, the information provision device 10a receives the recipe name, and displays information on a recipe extracted based on the recipe name in the user terminal 30.

Figure 2:
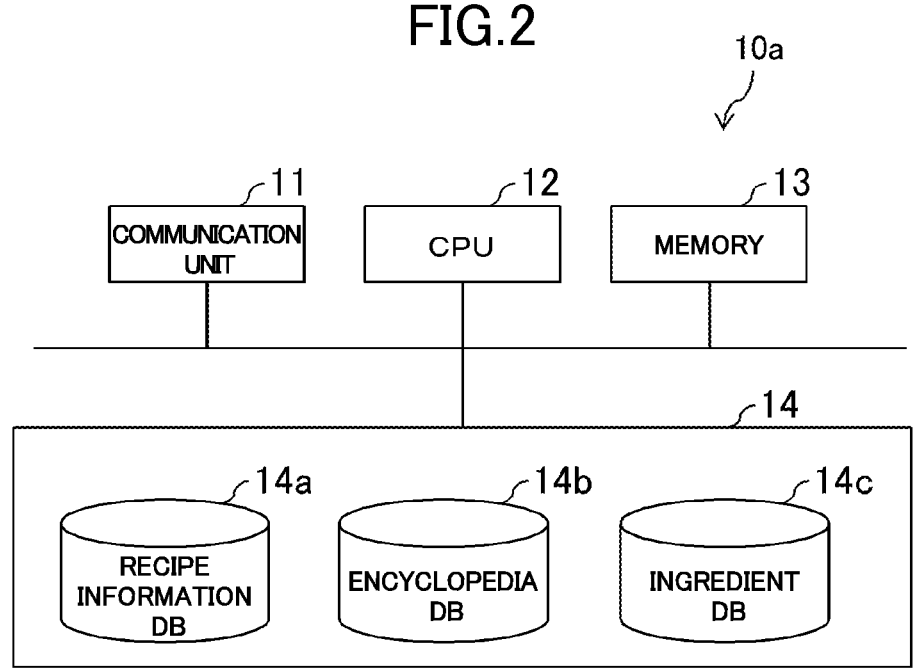
FIG. 2 shows a hardware configuration of an information provision device according to this embodiment.

FIG. 2 shows a hardware configuration of the information provision device 10a. As shown in the drawing, the information provision device 10a is a computer including a communication unit 11, a CPU 12, a memory 13, and a data server 14. These hardware devices are connected to each other so as to exchange data via a bus. The communication unit 11 executes data communication with the user terminal 30 via the communication network 20 such as the Internet or the like. The CPU 12 controls the respective units of the information provision device 10a, and executes various kinds of information processing. The memory 13 has various programs and data stored therein. In addition, a working area for the CPU 12 is ensured in the memory 13.

Figures 3, 4:
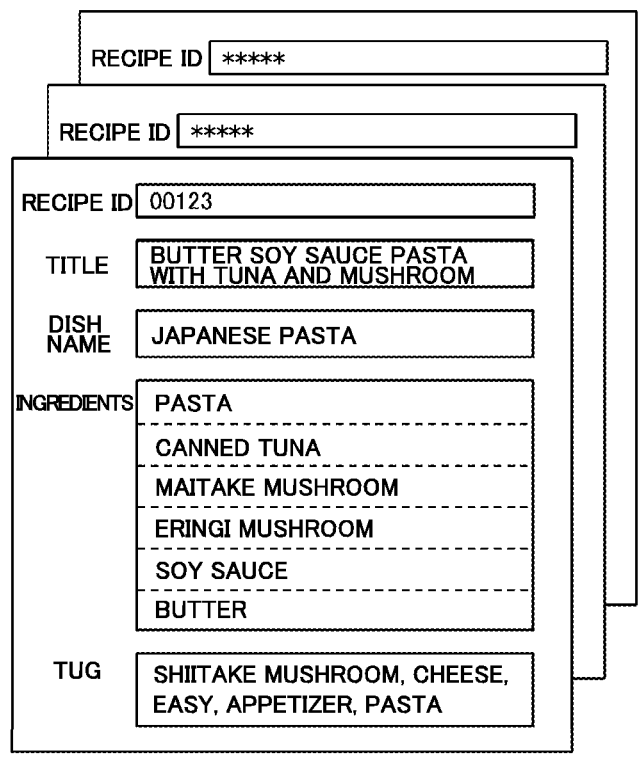
FIG. 3 shows one example of a recipe information list.
FIG. 4 shows one example of an ingredient DB according to a first embodiment.

The data server 14 includes a database, such as a recipe information DB 14a, an encyclopedia DB 14b, an ingredient DB 14c, or the like. The recipe information DB 14a stores a recipe information list which lists, for each recipe posted by a user, pieces of information of the recipe. Specifically, recipe information includes a recipe ID, a title, a dish name (a cooking recipe name), a target number of people, an ingredient name, the amount of ingredient, a tug, a recipe image, directions, a posted time and date, and the like. These pieces of recipe information are stored so as to be correlated to each other for every recipe. FIG. 3 shows one example of the recipe information list for every recipe registered in the recipe information DB 14a, though a recipe image or the like correlated to each recipe is not shown in FIG. 3.

In the encyclopedia DB 14b, information, such as, an equivalent, a synonym, a hypernym, a hyponym, or the like, of a recipe name received from the user terminal 30 is stored. The encyclopedia DB 14b may be an encyclopedia server device provided outside the information provision device 10a, for executing various kinds of processing relevant to an encyclopedia site. In this case, the encyclopedia site is a website that discloses explanations on various issues, and upon receipt of a recipe name from the user terminal 30 or the information provision device 10a, the encyclopedia server device sends a web page showing an explanation of an issue indicated by the recipe name.

In the ingredient DB 14c, a plurality of recipes, ingredients used in the respective recipes, and the amounts of the respective ingredients are stored so as to be correlated to each other. Specifically, in the ingredient DB 14c, a recipe, ingredients of the recipe, and the amounts (set amounts) of the respective ingredients of the recipe necessary when the recipe is a main dish (main food) are stored so as to be correlated to each other. The recipe, the ingredients of the recipe, and the set amounts are determined in advance by an operator of the information provision device 10a and can be arbitrarily changed. An ingredient that is dominant (main ingredient) in making the recipe is set as an ingredient of the recipe stored in the ingredient DB 14c. The main ingredient set for a recipe may include one or more kinds of ingredients. The set amount is set based on the amount typically used for one person in making the recipe as a main dish, for example. The set amount may be the above mentioned amount for one person or a fewer amount (for example, 90% of the typical amount for one person), for example.

FIG. 4 shows one example of the ingredient DB 14c. As to a recipe "pasta", for example, "pasta" is registered as the main ingredient, and "90 g" is set, based on the amount (the set amount) of the ingredient "pasta" necessary for one person in making the recipe "pasta" as a main dish. Note that the set amount is set to 90% of the typical amount for pasta for one person, namely, "100 g". As to a recipe "hamburger", "minced meat" and "onion" are registered as main ingredients, and "80 g" and "40 g" are set as set amounts of the main ingredients "minced meat" and "onion", respectively. These set amounts as well are set to 90% of the typical amounts for hamburger for one person.

The recipe information DB 14a and the ingredient DB 14c may be provided outside the information provision device 10a, and connected to the information provision device 10a via the communication network 20.

The user terminal 30 is a terminal device for use by a user who utilizes various websites. The user terminal 30 accesses the information provision device 10a, based on a user operation. With the above, the user terminal 30 receives display data, such as HTML document or the like, from the information provision device 10a via the communication network 20, and displays a web page or the like. In the user terminal 30, a software, such as a browser, an e-mail client, or the like, is installed. As the user terminal 30, for example, a personal computer, a PDA (Personal Digital Assistant), a personal digital assistant such as a smart phone or the like, a portable phone, or the like is used.

[Posting and Displaying of a Recipe]

A method for posting and displaying a recipe will be described referring to FIGS. 5 and 6.

A user going to post a recipe on a recipe site inputs recipe information in the user terminal 30. The information provision device 10a registers the inputted recipe information in the recipe information DB 14a. This completes the posting of a recipe. In the following, a method for registering an ingredient will be described as one example.

In registration of an ingredient of a recipe, a user selects an ingredient registration form on a web page for inputting recipe information, displayed on a screen of the user terminal 30, for example. Thereupon, an ingredient registration screen image as shown in FIG. 5A is displayed on the screen of the user terminal 30. In the ingredient registration screen image, a plurality of ingredient registration boxes 31-1 to 31-n and a store button are displayed. "N" indicates the order of an ingredient name shown in the ingredient space. This order corresponds to the order for displaying in an ingredient list on a recipe page displayed on the screen of the user terminal 30. For example, a plurality of ingredient registration boxes 31-n are displayed aligned in order, like an ingredient registration box 31-1 followed by an ingredient registration box 31-2, for example, from the top to the bottom of the screen. Each ingredient registration box 31-n is an area in which information (an ingredient name) on one kind of ingredient is inputted. The ingredient registration box 31-n includes a box into which an ingredient name is inputted and a box into which the amount of the ingredient is inputted. Although two ingredient registration boxes 31-n are shown in FIG. 5A, the number of ingredient registration boxes 31-n can be increased/decreased through a user operation.

In FIG. 5B, an example of the ingredient registration screen displayed when the names of ingredients of a recipe with the title "butter soy sauce pasta with tuna and mushroom" are inputted. As shown in the drawing, assume that a user inputs "pasta", "canned tuna", "maitake mushroom", "eringi mushroom", "soy sauce", and "butter" as ingredient names in the respective ingredient registration boxes 31-1 to 31-6. The inputted ingredient names are stored upon selection of the store button by the user, and a web page for inputting recipe information is displayed again. This completes registration of ingredients. Note that "pasta" is registered as the main ingredient in FIG. 5B, and "100 g" as the amount thereof for one person.

The user inputs various other pieces of recipe information, such as a title, a dish name, a tug, or the like. After the user's operation for registering recipe information is finished, the information provision device 10a registers the inputted recipe information in the recipe information DB 14a. This completes the posting of a recipe.

FIG. 6 shows an example of a recipe page displayed. A recipe page is a web page for displaying information on a posted recipe in the user terminal 30. As shown in FIG. 6, a recipe ID, a title, a dish name, a target number of people, ingredients, the amounts of ingredients, a tug (comment), a recipe image, directions, or the like, are displayed on the recipe page. The recipe ID is identification information of a recipe. The title is information describing feature, nature, or the like, of the dish named by a user. The dish name is a typical name of the dish, and selected by the user from a dish name list in an operation of inputting the recipe information, for example. Note that the dish name corresponds to a recipe name inputted by a user searching for a recipe. The target number of people indicates the number of people for whom the dish can be made using the ingredients in the amounts displayed in the ingredient space. The ingredient and the amount thereof shown in the ingredient space are those of the recipe inputted by the user. In the ingredient space, the name of an ingredient and the amount thereof are displayed for every ingredient. The order of ingredients (the order for display) shown in the ingredient space coincides with the order (the order for display) in which the ingredient names have been inputted by the user on the ingredient registration screen. The tug indicates a comment, a keyword, or the like, registered by the user. Specifically, a tug indicates feature, relevant information, or the like, of the recipe. The posted time and date indicates the time and date when the recipe has been posted by the user. The recipe image is an image of the recipe registered by the user. The directions are directions for making the dish, and a description and an image for explaining the procedure for making the dish are displayed in the directions space.

[Provision of Recipe Information]

In searching for a desired recipe, a user inputs the name of its desired recipe in the user terminal 30. Schematically, when the information provision device 10a receives the recipe name from the user terminal 30, the information provision device 10a extracts appropriate recipe information, based on the recipe name, and sends a search result page showing the extracted recipe information to the user terminal 30. In the following, a specific configuration of the information provision device 10a having the above mentioned function will be described.

Figure 7:
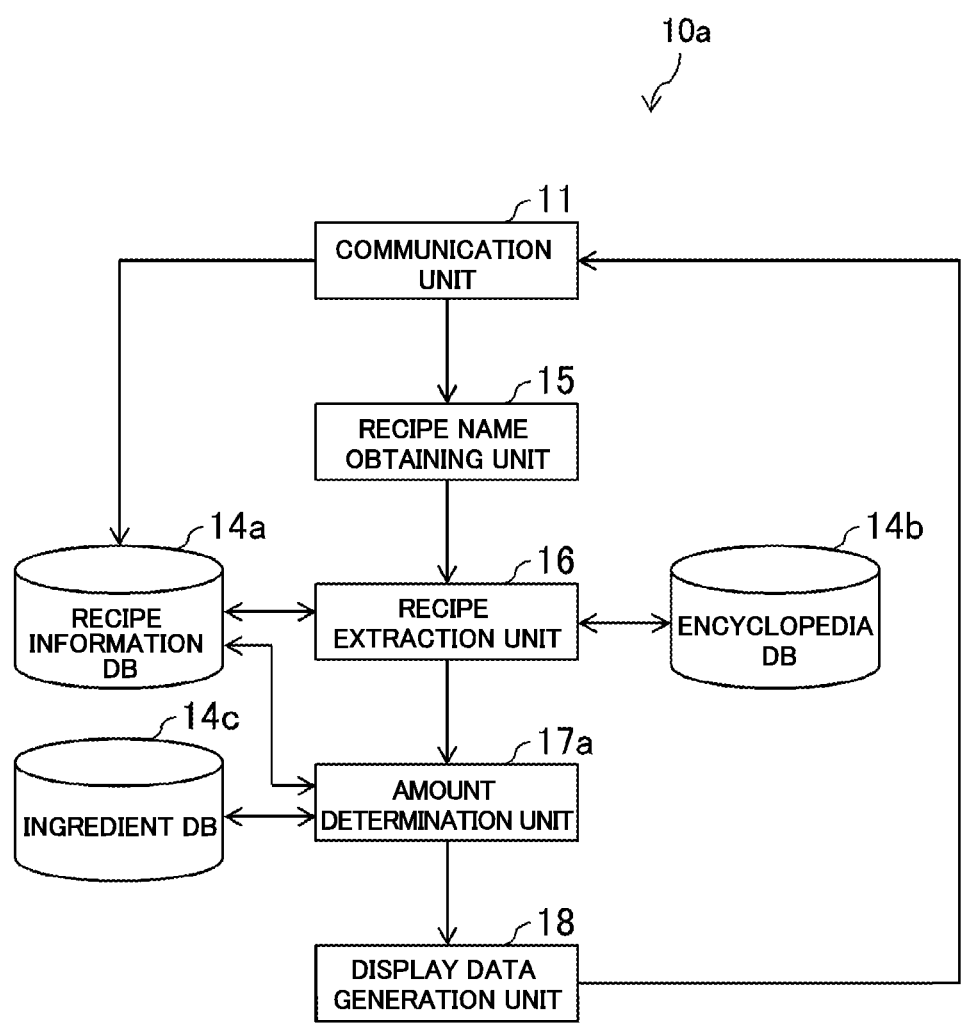
FIG. 7 is a functional block diagram of an information provision device according to the first embodiment.

FIG. 7 is a functional block diagram of the information provision device 10a. As shown in the diagram, the information provision device 10a functionally includes a recipe name obtaining unit 15, a recipe extraction unit 16, an amount determination unit 17a, and a display data generation unit 18. These components are implemented by the CPU 12 by executing a program stored in the memory 13 (see FIG. 2). This program may be installed into the information provision device 10a from a computer readable information storage medium, such as a CD-ROM, a DVD-ROM, a memory card, or the like, or downloaded from the communication network 20, such as the Internet, or the like.

The recipe name obtaining unit 15 obtains via the communication unit 11 a recipe name inputted by a user in the user terminal 30. A user inputs "pasta", "hamburger", or the like, for example, as a recipe name.

The recipe extraction unit 16 extracts a recipe (a recipe ID) that includes in the recipe information thereof the recipe name obtained by the recipe name obtaining unit 15 from the recipe information DB 14a. For example, in a case where the recipe name is "pasta" and the term "pasta" is included in at least any of the title, the dish name, the ingredient, the tug or the like of recipe information of a recipe, that recipe is extracted. Through this processing, however, a recipe with the term "pasta" included only in the ingredient thereof, but not in either the title, the dish name, or the tug thereof, is also extracted. That is, not only a recipe "pasta" as a main dish but also a recipe "hamburger" including "pasta" as a side dish (trimmings) are extracted.

The recipe extraction unit 16 obtains a word (a corresponding word) corresponding to the recipe name from the encyclopedia DB 14b, and extracts a recipe with the corresponding word included in the recipe information thereof. A corresponding word includes an equivalent, a synonym, a hypernym, a hyponym, or the like. For example, in a case where "spaghetti" is registered as a corresponding word of "pasta" in the encyclopedia DB 14b, the recipe extraction unit 16 extracts a recipe (a recipe ID) that includes the term "spaghetti" in the recipe information thereof. As described above, the recipe extraction unit 16 extracts not only a recipe including a word same as the recipe name but also a recipe including a word corresponding to the recipe name. That is, a recipe name inputted by a user includes a keyword relevant to the recipe name, such as a word corresponding to the recipe name, or the like, as well. In the description below, a case in which a word same as the recipe name is included in the recipe information is described as an example, and a case in which a corresponding word is included in the recipe information is not described.

The amount determination unit 17a compares the amount (the registered amount) of the main ingredient of a recipe corresponding to the obtained recipe name among the plurality of ingredients registered in the recipe information (the recipe information DB 14a) of a recipe extracted by the recipe extraction unit 16 and the amount (the set amount) of the main ingredient of the recipe set in the ingredient DB 14c (see FIG. 4) to determine whether or not the registered amount is equal to or greater than the set amount.

For example, as to a recipe "pasta" extracted by the recipe extraction unit 16, in a case where "100 g" is registered in the recipe information in the recipe information DB 14a as the amount (the registered amount) of the main ingredient "pasta" of the recipe "pasta" corresponding to the obtained recipe name "pasta", the amount determination unit 17a compares the registered amount "100 g" and the amount (the set amount) "90 g" of the main ingredient "pasta" of the recipe "pasta" set in the ingredient DB 14c (see FIG. 4) and determines that the registered amount is equal to or greater than the set amount.

For example, as to a recipe "hamburger" extracted by the recipe extraction unit 16, in a case where "30 g" is registered in the recipe information in the recipe information DB 14a as the amount (the registered amount) of the main ingredient "pasta" of the recipe "pasta" corresponding to the obtained recipe name "pasta", the amount determination unit 17a compares the registered amount "30 g" and the amount (the set amount) "90 g" of the main ingredient "pasta" of the recipe "pasta" set in the ingredient DB 14c (see FIG. 4) and determines that the registered amount is less than the set amount.

The amount determination unit 17a executes the above mentioned determination processing with respect to all of the recipes extracted by the recipe extraction unit 16. Note that in a case where the amount of an ingredient registered in the recipe information in the recipe information DB 14a is for n number of people (n being an integer of two or greater), that is, the target number of people of the recipe is n persons, the above mentioned processing is executed after the amount is converted into one for one person.

The display data generation unit 18 extracts one or more recipes from among the plurality of recipes extracted by the recipe extraction unit 16, based on the result of determination by the amount determination unit 17a, and generates display data of the extracted recipe. For example, the display data generation unit 18 extracts one or more recipes with the registered amount thereof equal to or greater than the set amount from among the plurality of recipes extracted by the recipe extraction unit 16, and generates display data of the extracted recipe. The display data is, for example, an HTML document of a search result page on which information on the plurality of extracted recipes are listed. Further, the display data generation unit 18 may reorder the information on the plurality of extracted recipes into an order beginning with one with the latest post time and date, and generate an HTML document of a search result page on which information on the reordered recipes is listed. Still further, the display data generation unit 18 sets in the display data a link or the like to a recipe page showing the recipe information (see FIG. 6). The display data generation unit 18 sends the generated display data to the user terminal 30 of a user having inputted the recipe name via the communication unit 11.

Having received the display data (HTML document) from the information provision device 10a via the communication network 20, the user terminal 30 displays a search result page shown in FIG. 8, for example, on a screen, based on the HTML document.

[Recipe Information Provision Processing]

Figure 9:
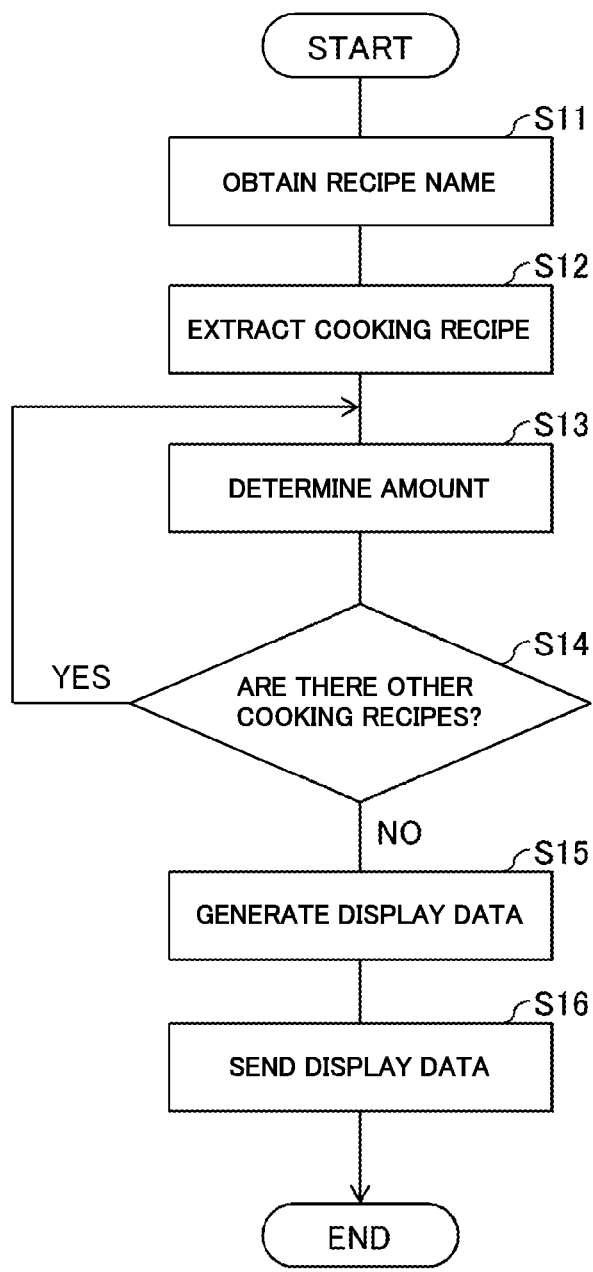
FIG. 9 is a flowchart of an operation of an information provision device.

Recipe information provision processing by the information provision device 10a will be described. FIG. 9 shows a flowchart of an operation of the information provision device 10a. Below, a case in which a user inputs "pasta" as a recipe name will be described.

Initially, at step (hereinafter abbreviated as "S") 11, the recipe name obtaining unit 15 obtains the recipe name "pasta" from the user terminal 30 via the communication unit 11. Thereafter, the recipe extraction unit 16 extracts a plurality of recipes (recipe ID) each including the recipe name "pasta" in the recipe information thereof from the recipe information DB 14a (S12).

Thereafter, the amount determination unit 17a compares the amount (the registered amount) of the main ingredient of a recipe corresponding to the obtained recipe name, registered in the recipe information of the recipe (the recipe ID) extracted by the recipe extraction unit 16, and the amount (the set amount) of the main ingredient of the recipe set in the ingredient DB 14c to determine whether or not the registered amount is equal to or greater than the set amount (S13). In the above, the amount determination unit 17a determines, as to the recipe extracted by the recipe extraction unit 16, whether or not the registered amount of the main ingredient "pasta" of the recipe "pasta" corresponding to the obtained recipe name "pasta" is equal to or greater than the set amount. The amount determination unit 17a repetitively executes the above described determination processing for every recipe extracted by the recipe extraction unit 16 (S14).

Upon completion of the above described determination processing with respect to all recipes (No at S14), the display data generation unit 18 extracts a recipe with the registered amount thereof equal to or greater than the set amount from among the plurality of recipes extracted by the recipe extraction unit 16, and generates display data (HTML document) of the extracted recipe (S15). The display data generation unit 18 sends the generated display data to a user terminal via the communication unit 11 (S16). The above completes the recipe information provision processing in the information provision device 10*a*.

Thereafter, having received the display data (HTML document) from the information provision device 10*a* via the communication network 20, the user terminal 3 displays the search result page (see FIG. 8) as a web page on a screen. A link is set in the title, for example, of the search result page, so that a user can review a web page (see FIG. 6) of its desired recipe by selecting (clicking) the title of the recipe.

As described above, according to the cooking recipe information provision system according to the first embodiment, a recipe that is extracted based on the amount of the main ingredient of a recipe desired by a user is displayed in the user terminal 30. Thus, it is possible to prevent, for example, a recipe not desired by a user from being displayed on the search result page. For example, in case where a user inputs a recipe name "pasta", the plurality of recipes extracted by the recipe extraction unit 16 may include a recipe "hamburger" that includes "pasta" as a side dish. In this case, the amount of the ingredient "pasta" of the recipe "hamburger" is less than the typical amount (for example, 100 g) for one person. Thus, the registered amount of the main ingredient "pasta" of the recipe "pasta" corresponding to the recipe name, registered in the recipe information of the recipe "hamburger" is less than the set amount, and therefore, the recipe "hamburger" is excluded from the display data. That is, in a case where the main ingredient "pasta" of the recipe "pasta" desired by a user is registered as one of the ingredients of a recipe "hamburger", the recipe "hamburger" is not displayed on the search result page. Thus, only a recipe of "pasta" desired by a user is displayed on the search result page, so that the user can review its desired recipe.

Note here that although, in the above described configuration, the display data generation unit 18 extracts a recipe with the registered amount of the main ingredient thereof equal to or greater than the set amount from among the plurality of recipes extracted by the recipe extraction unit 16, and generates display data of the extracted recipe, the configuration of the display data generation unit 18 is not limited to the above described. For example, the display data generation unit 18 may extract a recipe with the registered amount of the main ingredient thereof less than the set amount from among the plurality of recipes extracted by the recipe extraction unit 16, and generate display data of the extracted recipe. With the above, information on various kinds of recipes registered as a side dish is displayed on the search result page. For example, when a user wishes to review a recipe including "pasta" as a side dish, it is possible to display a recipe such as "hamburger" or the like.

According to the cooking recipe information provision system having the above described configuration, a screen image for selecting "main dish" or "side dish" may be displayed in a recipe search image displayed in the user terminal 30, so that the display data generation unit 18 extracts a recipe, based on the result of selection and the result of determination by the amount determination unit 17*a*, and generates display data of the plurality of extracted recipes. Specifically, in a case where a user inputs a recipe name "pasta" and selects "main dish", the display data generation unit 18 extracts a recipe with the registered amount of the main ingredient "pasta" equal to or greater than the set amount from among the plurality of recipes "pasta" extracted by the recipe extraction unit 16, and generates display data of the extracted recipe. Meanwhile, in a case where a user inputs a recipe name "pasta" and selects "side dish", the display data generation unit 18 extracts a recipe with the registered amount of the main ingredient "pasta" less than the set amount from among the plurality of recipes "pasta" extracted by the recipe extraction unit 16, and generates display data of the extracted recipe. Note that the set amount of "main dish" may differ from that for "side dish".

Second Embodiment

A second embodiment of the present invention will be described referring to the drawings. For convenience of description, a component having the same function as that in the first embodiment is given the same reference numeral, and not described again. A terminology defined in the first embodiment is similarly applied in this embodiment unless otherwise stated.

A hardware configuration of an information provision device 10*b* according to the second embodiment is the same as that of the information provision device 10*a* according to the first embodiment (see FIG. 2). The information provision device 10*b* according to the second embodiment is different in the data configuration of the ingredient DB 14*c* (see FIG. 2) of the information provision device 10*a* according to the first embodiment, and an ingredient DB 14*d* will be described below.

Figure 10:
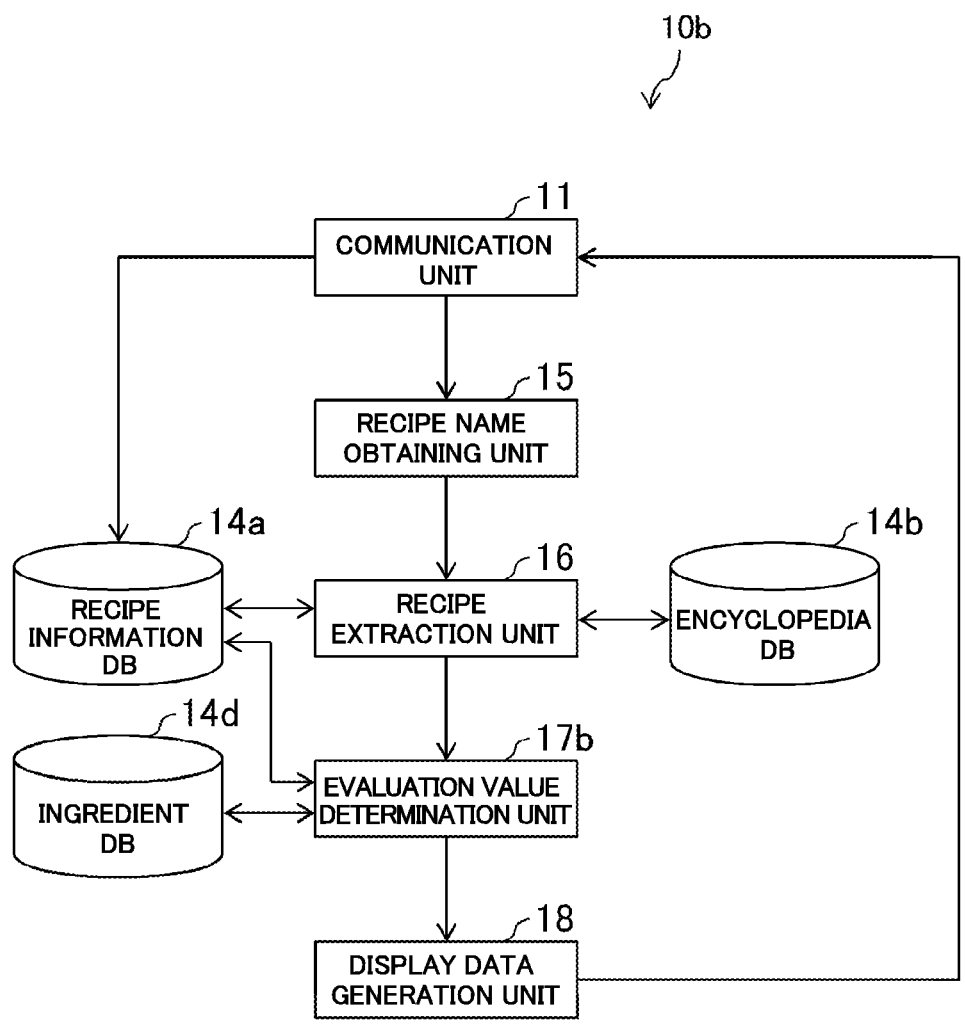
FIG. 10 is a functional block diagram of an information provision device according to a second embodiment.

FIG. 10 is a functional block diagram of the information provision device 10*b* according to the second embodiment. As shown in the drawing, the information provision device 10*b* functionally includes the recipe name obtaining unit 15, the recipe extraction unit 16, an evaluation value determination unit 17*b*, and the display data generation unit 18. These components are implemented by the CPU 12 by executing a program stored in the memory 13.

In the ingredient DB 14*d*, an ingredient of a recipe, the amount of the ingredient, and an evaluation value in accordance with the amount are stored. Specifically, as to one kind of ingredient, the amount thereof is divided into a plurality of ranges (a set amount), and different evaluation values are set to the amounts in the respective ranges. The recipe, the ingredient of the recipe, the set amount, and the evaluation value are determined in advance by an operator of the information provision device 10*b*, and can be arbitrarily changed. The main ingredient of a recipe is set as an ingredient of the recipe. One or more kinds of ingredients may be set as the main ingredient of a recipe. In a case where the set amount is divided into three ranges, for example, the set amount is set to a half of the amount generally used for one person in making the recipe. Note that the number of ranges into which the set amount is divided is not limited to any particular number.

FIG. 11 shows one example of the ingredient DB 14*d*. As to the recipe "pasta", for example, in a case where "pasta" is set as the main ingredient and the amount of the ingredient "pasta" necessary for one person for the recipe "pasta" as a main dish is "100 g", a first set amount is set to "0 g or over and under 50 g", a second set amount to "50 g or over and under 100 g", and a third set amount to "100 g or over". An evaluation value "1" is set to the first set amount, "3" to the second set amount, and "5" to the third set amount.

As to the recipe "hamburger", in a case where "minced meat" and "onion" are set as the main ingredients and the amounts of the ingredient "minced meat" and of the ingredient "onion" necessary for one person for the recipe "hamburger" as a main dish are "80 g" and "40 g", respectively, the first set amount of "minced meat" is set to "0 g or over and under 40 g", the second set amount to "40 g or over and under 80 g", and the third set amount to "80 g or over", and the first set amount of "onion" is set to "0 g or over and under 20 g", the second set amount to "20 g or over and under 40 g", and the third set amount to "40 g or over". An evaluation value "1" is set to the respective first set amounts, "3" to the respective second set amounts, and "5" to the respective third set amounts.

With reference to the amount (the registered amount) of the main ingredient of a recipe corresponding to the recipe name obtained by the recipe name obtaining unit 15, registered in the recipe information of a recipe extracted by the recipe extraction unit 16, and the amount (the set amount) of the main ingredient of the recipe set in the ingredient DB 14d (see FIG. 11), the evaluation value determination unit 17b determines an evaluation value of the recipe extracted by the recipe extraction unit 16.

For example, in a case where the recipe name obtained by the recipe name obtaining unit 15 is "pasta", the recipe extracted by the recipe extraction unit 16 is "pasta", and "100 g" is registered in the recipe information in the recipe information DB 14a as the amount (the registered amount) of the main ingredient "pasta" of the recipe "pasta" corresponding to the obtained recipe name "pasta", the evaluation value determination unit 17b determines an evaluation value of the extracted recipe "pasta" as "5" that is set to the evaluation value of the third set amount, with reference to the ingredient DB 14d (see FIG. 11).

For example, in a case where the recipe name obtained by the recipe name obtaining unit 15 is "pasta", the recipe extracted by the recipe extraction unit 16 is "hamburger", and "20 g" is registered in the recipe information in the recipe information DB 14a as the amount (the registered amount) of the main ingredient "pasta" of the recipe "pasta" corresponding to the obtained recipe name "pasta", the evaluation value determination unit 17b determines an evaluation value of the extracted recipe "hamburger" as "1" that is set to the evaluation value of the first set amount.

For example, in a case where the recipe name obtained by the recipe name obtaining unit 15 is "hamburger", the recipe extracted by the recipe extraction unit 16 is "hamburger", and "50 g" and "20 g" are respectively registered in the recipe information in the recipe information DB 14a as the amounts (the registered amount) of the main ingredients "minced meat" and "onion" of the recipe "hamburger" corresponding to the obtained recipe name "hamburger", the evaluation value determination unit 17b determines an evaluation value of the extracted recipe "hamburger" as "3" that is the average of the evaluation value "3" of the second set amount of "minced meat" and the evaluation value "3" of the second set amount of "onion", with reference to the ingredient DB 14d.

For example, in a case where the recipe name obtained by the recipe name obtaining unit 15 is "hamburger", the recipe extracted by the recipe extraction unit 16 is "curry", and "20 g" and "18 g" are respectively registered in the recipe information in the recipe information DB 14a as the amounts (the registered amount) of the main ingredients "minced meat" and "onion" of the recipe "hamburger" corresponding to the obtained recipe name "hamburger", the evaluation value determination unit 17b determines an evaluation value of the extracted recipe "curry" as "1" that is the average of the evaluation value "1" of the first set amount of "minced meat" and the evaluation value "1" of the first set amount of "onion", with reference to the ingredient DB 14d. Note that in a case where the plurality of main ingredients registered in the recipe information coincide with the main ingredients in the ingredient DB 17b, as described above, preferably, the evaluation value of the recipe is an average obtained by dividing the total value of the evaluation values of the respective main ingredients by the number of the involved main ingredients.

The evaluation value determination unit 17b generates an evaluation value list for correlating a recipe (a recipe ID) and an evaluation value of the recipe. FIG. 12 shows one example of the evaluation value list.

With reference to the evaluation value list generated by the evaluation value determination unit 17b, the display data generation unit 18 extracts a recipe, based on the evaluation value of each recipe, and generates display data of the extracted recipe. The display data is, for example, an HTML document of a search result page showing a list of information on a plurality of extracted recipes. The display data generation unit 18 may reorder the evaluation value list into an order beginning with a recipe with a higher evaluation value and generate an HTML document of a search result page on which information on the reordered recipes is listed, or may extract ten recipes with the top ten evaluation values and generate an HTML document of a search result page on which information on the extracted recipes is listed. Further, the display data generation unit 18 sets in the display data a link or the like to a recipe page showing recipe information (see FIG. 4). The display data generation unit 18 sends the generated display data to the user terminal 30 of a user having inputted the recipe name via the communication unit 11.

[Recipe Information Provision Processing]

Figure 13:
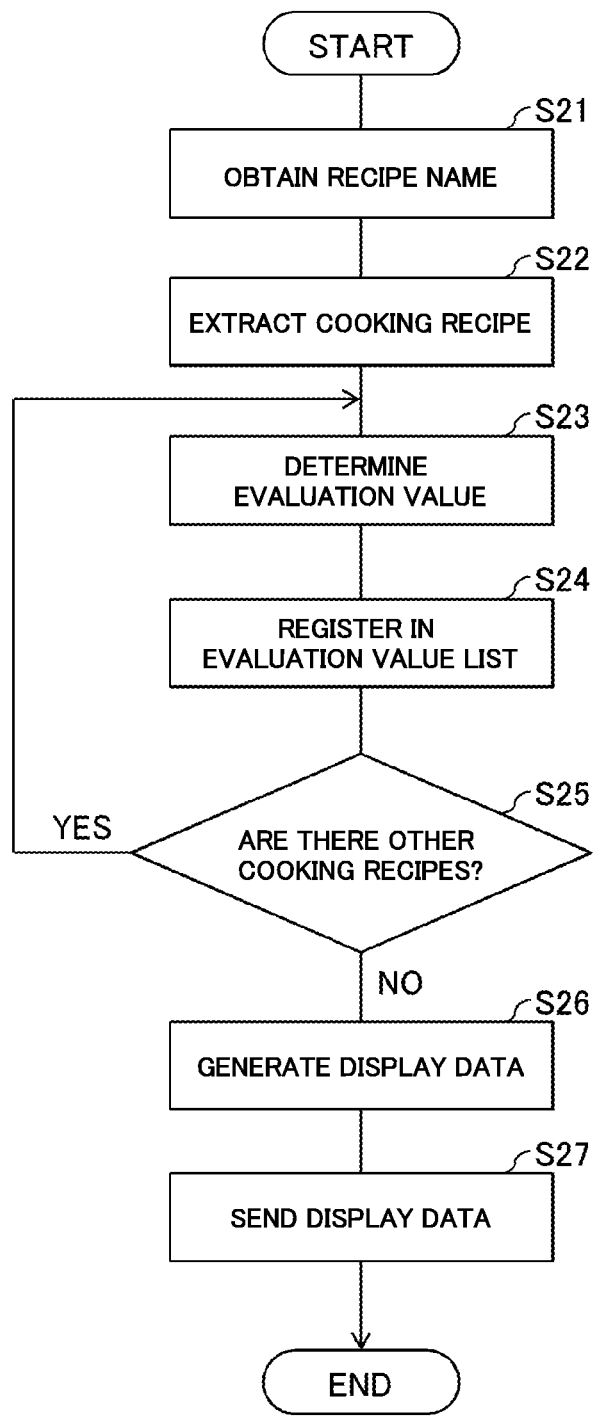
FIG. 13 is a flowchart of an operation of an information provision device according to the second embodiment.

Recipe information provision processing in the information provision device 10b according to the second embodiment will be described. FIG. 13 is a flowchart of an operation of the information provision device 10b. Below, a case in which a user inputs "pasta" as a recipe name will be described as an example.

A flow of an operation of the information provision device 10b according to the second embodiment is different from that (see FIG. 9) of the information provision device 10a according to the first embodiment in that evaluation value determination processing (S23) replaces the amount determination processing (S13), and evaluation value list generation processing (S24) is added, with the remaining processing being similar to that of the information provision device 10a.

Initially, at S21, the recipe name obtaining unit 15 obtains a recipe name "pasta" from the user terminal 30 via the communication unit 11. Then, the recipe extraction unit 16 extracts a plurality of recipes (recipe ID) with the recipe name "pasta" included in the recipe information thereof from the recipe information DB 14a (S22).

Then, referring to the ingredient DB 14d (see FIG. 11), the evaluation value determination unit 17b determines an evaluation value of each of the recipes extracted by the recipe extraction unit 16 (S23). Specifically, with reference to the amount (the registered amount) of the main ingredient "pasta" of the recipe "pasta" corresponding to the recipe name "pasta" obtained by the recipe name obtaining unit 15, registered in the recipe information of a recipe extracted by the recipe extraction unit 16 and the amount (the set amount) of the main ingredient "pasta" of the recipe "pasta", set in the ingredient DB 14d (see FIG. 11), the evaluation value determination unit 17b determines an evaluation value of the recipe extracted by the recipe extraction unit 16. Then, the evaluation value determination unit 17b registers the extracted recipe (recipe ID) and the evaluation value of the recipe so as to be correlated to each other in the evaluation value list (see FIG. 12) (S24). The evaluation value determination unit 17b repetitively executes the above described processing for every recipe extracted by the recipe extraction unit 16 (S25).

When the above described processing is completed with respect to all of the recipes (No at S25), the display data generation unit 18 reorders the evaluation value list generated by the evaluation value determination unit 17b into an order beginning with a recipe with a higher evaluation value, and generates display data (HTML document) of the top ten recipes (S26). The display data generation unit 18 sends the generated display data to the user terminal via the communication unit 11 (S27). The above completes the recipe information provision processing in the information provision device 10b.

Thereafter, having received the above described display data (HTML document) from the information provision device 10b, the user terminal 3 displays a search result page as a web page on a screen (see FIG. 8). A link is set in the title, for example, of the search result page, so that a user can review a web page of its desired recipe (see FIG. 6) by selecting (clicking) the title of the recipe.

As described above, according to the cooking recipe information provision system according to the second embodiment, similar to the cooking recipe information provision system according to the first embodiment, a recipe is extracted based on the amount of the main ingredient of the recipe desired by a user, and displayed in the user terminal 3. Further, as display data is generated based on the evaluation value determined for every recipe, it is possible to provide information on only a recipe having a high evaluation value, that is, a recipe with a large amount and thus highly likely registered as a main dish.

Still further, according to the cooking recipe information provision system according to the second embodiment, it is possible to provide information only on a recipe having a low evaluation value, that is, a recipe with a small amount and thus highly likely registered as a side dish. Yet further, it is possible to provide information on recipes listed in order beginning with one with a lower evaluation value. Yet further, similar to the cooking recipe information provision system according to the first embodiment, it is possible to display a screen image for selecting either "main dish" or "side dish" on the recipe search screen displayed in the user terminal 30, so that the display data generation unit 18 extracts a recipe, based on the selection result and the evaluation value determined by the evaluation value determination unit 17b, and generate display data of the plurality of extracted recipes.

Note that there is a tendency that a user, in posting a recipe, decides the order of ingredients listed in the ingredient space in accordance with the importance of the ingredients. For example, an ingredient listed earlier in order is highly possibly an important ingredient, that is, the main ingredient, of the recipe. This is because an ingredient is one of the elements that determine feature, nature, and so forth, of a dish, and the main ingredient, in particular, is highly likely an ingredient that dominates the feature of the dish.

In view of the above, the evaluation value determination unit 17b may determine an evaluation value "1" to "5" in accordance with the order of the main ingredient listed in the ingredient space where ingredients of a recipe are shown, and add the determined evaluation value to the above described determined evaluation value in accordance with the amount of the main ingredient. The order of the main ingredient is an order for displaying in the ingredient space when the recipe page shown in FIG. 6 is displayed in the user terminal 30, and corresponds to the order of the ingredient registration boxes 3-1 to 31-n on the ingredient registration screen shown in FIG. 5B. For example, in a case where the main ingredient is firstly registered in the ingredient space, the evaluation value is set to "5", and in a case where the main ingredient is secondly registered, the evaluation value is set to "4". Thereafter, the evaluation value is set to "3" to "1", sequentially. In a case where the main ingredient is sixthly or thereafter registered, the evaluation value is set to "1" or "0".

As described above, the evaluation value determination unit 17b determines an evaluation value of a recipe, based on the amount of the main ingredient and the order thereof listed in the ingredient space. With the above, it is possible to provide information on a more suitable recipe to a user as the importance of the ingredient is taken into consideration.

The present invention is not limited to the above described first and second embodiments. That is, although, in the first and second embodiments, it is configured that, upon receipt of a recipe name inputted by a user from the user terminal 30, the information provision device 10a, 10b sends recipe information based on the recipe name to the user terminal 30, the present invention is not limited to this configuration. For example, the information provision device 10a, 10b may provide recipe information to unspecific user terminal or other web page without receiving a recipe name from a user terminal. For example, the information provision device 10a, 10b may regularly or irregularly aggregate recipe information for every recipe, and send an updated recipe page to a user registered in a recipe web page, or introduce a seasonal recipe on a recipe page available all the time. In this case, the information provision device 10a, 10b may set the recipe name (for example, "pasta") of the recipe page or the recipe name of the seasonal recipe as a recipe name to be obtained by the recipe name obtaining unit 15 in executing the above described recipe provision processing (see FIGS. 9 and 13).

As described above, the information provision device 10a, 10b includes the recipe name obtaining unit 15 for obtaining a recipe name inputted by a user, the recipe extraction unit 16 for extracting a plurality of recipes, based on the obtained recipe name, from the recipe information DB 14a for storing a plurality of recipes, ingredients used in the respective recipes, and the amounts of the respective ingredients so as to be correlated to each other, and the display data generation unit 18 for extracting a recipe, based on the amount of the main ingredient used in a recipe corresponding to the recipe name obtained by the recipe name obtaining unit 15, from among the plurality of extracted recipes, and generating display data indicating information on the extracted recipe.

The information provision device 10a may further include the amount determination unit 17a for determining, as to each of the plurality of recipes extracted by the recipe extraction unit 16, whether or not the amount of the main ingredient is equal to or greater than the set amount.

In the information provision device 10a, the display data generation unit 18 may extract a recipe with the main ingredient thereof in an amount equal to or greater than the set amount from among the plurality of recipes extracted by the recipe extraction unit 16, and generate display data indicating information on the extracted recipe.

In the information provision device 10a, with reference to the ingredient DB 14c for storing a recipe, a main ingredient used in the recipe, and the set amount of the main ingredient that is set based on the amount for the recipe for one person so as to be correlated to each other, the amount determination unit 17*a* may determine, as to each of the plurality of recipes extracted by the recipe extraction unit 16, whether or not the amount of the main ingredient of a recipe corresponding to the recipe name obtained by the recipe name obtaining unit 15 is equal to or greater than the set amount.

The information provision device 10*b* may further include the evaluation value determination unit 17*b* for determining, as to each of the plurality of recipes extracted by the recipe extraction unit 16, an evaluation value of the recipe, based on the amount of the main ingredient. Further, in the information provision device 10*b*, the display data generation unit 18 may generate display data, based on the evaluation value determined by the evaluation value determination unit 17*b*.

In the information provision device 10*b*, the evaluation value determination unit 17*b* may set higher the evaluation value of a recipe with the main ingredient thereof in an amount equal to or greater than the set amount than that of a recipe with the main ingredient thereof in an amount less than the set amount.

In the information provision device 10*b*, the evaluation value determination unit 17*b* may set higher the evaluation value of a recipe with the main ingredient thereof in a larger amount.

In the information provision device 10*b*, the display data generation unit 18 may generate display data of a list of information on recipes ordered beginning with one with a higher evaluation value determined by the evaluation value determination unit 17*b*.

In the information provision device 10*b*, with reference to the ingredient DB 14*d* for storing a recipe, a main ingredient used in the recipe, and an evaluation value set in accordance with the amount of the main ingredient so as to be correlated to each other, the evaluation value determination unit 17*b* may determine, as to each of the plurality of recipes extracted by the recipe extraction unit 16, an evaluation value of the recipe, based on the amount of the main ingredient of a recipe corresponding to the recipe name obtained by the recipe name obtaining unit 15.

The invention claimed is:

1. A cooking recipe search result provision device, comprising:
at least one memory operable to store program code; and
at least one processor operable to read said program code, and execute according to said program code, said program code comprising:
recipe search code that causes the at least one processor to search for a recipe by using a cooking recipe name inputted by a user, wherein each recipe includes two or more ingredients, and each recipe is posted through an Internet network;
recipe extraction code causing at least one of said at least one processor to extract one or more cooking recipes from a plurality of cooking recipes based on the cooking recipe name from a first storage storing the plurality of cooking recipes, ingredients used in the respective cooking recipes, and amounts of the respective ingredients so as to be correlated to each other;
display data generation code causing at least one of said at least one processor to:
determine a registered amount of an ingredient, registered in the first storage, corresponding to the cooking recipe name, for each of the respective one or more cooking recipes; and
determine a set amount of the ingredient, set in advance as an amount necessary to qualify the ingredient as a main ingredient and stored in a second storage storing a plurality of ingredients and corresponding set amounts; and
amount determination code causing at least one of the said at least one processor to:
determine, as to each of the one or more cooking recipes, whether or not the registered amount of the ingredient is equal to or greater than the set amount of the ingredient set in advance; and
extract a cooking recipe from the one or more cooking recipes in which the registered amount of the ingredient is equal to or greater than the set amount of the ingredient, and generate the display data indicating the information on the cooking recipe extracted; and
search result presentation code that causes the at least one processor to cause a search result to be presented based on the generated display data,
wherein the program code further comprises evaluation value determination code causing at least one of the said at least one processor to determine, as to each of one or more cooking recipes, an evaluation value for each of the one or more cooking recipes, after comparing the registered amount of the ingredient and the set amount of the ingredient set in advance, and register the evaluation value in association with a corresponding cooking recipe in the first storage,
wherein the evaluation value determination code causes at least one of the said at least one processor to determine a higher evaluation value of a cooking recipe for which the registered amount of the ingredient is equal to or greater than the set amount of the ingredient set in advance than that of a cooking recipe for which the registered amount of the ingredient is less than the set amount of the ingredient set in advance, and
wherein the amount determination code causes at least one processor of the said at least one processor to extract a cooking recipe, based on the evaluation value, and generate the display data indicating information on the extracted cooking recipe.

2. The cooking recipe search result provision device according to claim 1, wherein, the set amount of the ingredient is set based on an amount necessary to qualify the ingredient as a main ingredient for one person, the amount determination code causes at least one said at least one processor to determine, as to each of the one or more cooking recipes, whether or not the registered amount of the ingredient is equal to or greater than the set amount of the ingredient set in advance.

3. The cooking recipe information search result device according to claim 1, wherein the evaluation value determination code causes at least one of the said at least one processor to determine a higher evaluation value for a cooking recipe for which the registered amount of the ingredient is larger than the registered amount of the ingredient for another cooking recipe.

4. The cooking recipe search result provision device according to claim 3, wherein the amount determination code causes at least one of the said at least one processor to generate the display data of information on the one or more cooking recipes listed in descending order based on the evaluation value.

5. The cooking recipe search result provision device according to claim 1, wherein, the second storage stores an evaluation value set in accordance with the amount of the ingredient, the evaluation value determination code causes at least one of the said at least one processor to determine, as to each of the one or more cooking recipes, an evaluation value of the one or more cooking recipes, based on the registered amount of the ingredient.

6. A cooking recipe search result provision method to be executed by a computer, comprising:
   searching for a recipe by using a cooking recipe name inputted by a user, wherein each recipe includes two or more ingredients, and each recipe is posted through an Internet network;
   extracting one or more cooking recipes, based on the cooking recipe name, from a first storage storing a plurality of cooking recipes, ingredients used in the respective cooking recipes, and amounts of the respective ingredients so as to be correlated to each other;
   determining a registered amount of an ingredient, registered in the first storage, corresponding to the cooking recipe name, for each of the respective one or more cooking recipes;
   determining a set amount of the ingredient, set in advance as an amount necessary to qualify the ingredient as a main ingredient and stored in a second storage storing a plurality of ingredients and corresponding set amounts;
   determining, as to each of the one or more cooking recipes, whether or not the registered amount of the ingredient is equal to or greater than the set amount of the ingredient set in advance;
   extracting a cooking recipe from the one or more cooking recipes in which the registered amount of the ingredient is equal to or greater than the set amount of the ingredient;
   generating display data indicating information on the extracted cooking recipe; and
   presenting a search result based on the generated display data,
   wherein the cooking recipe search result provision method further comprises determining, as to each of one or more cooking recipes, an evaluation value for each of the one or more cooking recipes, after comparing the registered amount of the ingredient and the set amount of the ingredient set in advance, and registering the evaluation value in association with a corresponding cooking recipe in the first storage,
   wherein a higher evaluation value is determined for a cooking recipe for which the registered amount of the ingredient is equal to or greater than the set amount of the ingredient set in advance than that of a cooking recipe for which the registered amount of the ingredient is less than the set amount of the ingredient set in advance, and
   wherein the extracting the cooking recipe comprises extracting a cooking recipe, based on the evaluation value, and generating the display data indicating information on the extracted cooking recipe.

7. A non-transitory computer-readable recording medium having stored therein a program that causes a computer to:
   search by a computer system for a recipe by using a cooking recipe name inputted by a user, wherein each recipe includes two or more ingredients, and each recipe is posted through an Internet network;
   extract by the computer system one or more cooking recipes, based on the cooking recipe name, from a first storage storing a plurality of cooking recipes, ingredients used in the respective cooking recipes, and amounts of the respective ingredients so as to be correlated to each other;
   determine by the computer system a registered amount of an ingredient, registered in the first storage, corresponding to the cooking recipe name, for each of the respective one or more cooking recipes;
   determine by the computer system a set amount of the ingredient, set in advance as an amount necessary to qualify the ingredient as a main ingredient and stored in a second storage storing a plurality of ingredients and corresponding set amounts;
   determine by the computer system as to each of the one or more cooking recipes, whether or not the registered amount of the ingredient is equal to or greater than the set amount of the ingredient set in advance;
   extract by the computer system a cooking recipe from the one or more cooking recipes in which the registered amount of the ingredient is equal to or greater than the set amount of the ingredient;
   generate by the computer system display data indicating information on the extracted cooking recipe; and
   present by the computer system a search result based on the generated display data, wherein the program further causes the computer to:
      determine by the computer system, as to each of one or more cooking recipes, an evaluation value for each of the one or more cooking recipes, after comparing the registered amount of the ingredient and the set amount of the ingredient set in advance, and register the evaluation value in association with a corresponding cooking recipe in the first storage,
      determine by the computer system, a higher evaluation value of a cooking recipe for which the registered amount of the ingredient is equal to or greater than the set amount of the ingredient set in advance than that of a cooking recipe for which the registered amount of the ingredient is less than the set amount of the ingredient set in advance, and
      extract by the computer system a cooking recipe, based on the evaluation value, and generate the display data indicating information on the extracted cooking recipe.

8. The cooking recipe search result provision device according to claim 1, wherein each recipe includes an ingredient list including the two or more ingredient, and
   wherein the evaluation value determination code causes at least one of the said at least one processor to determine a higher evaluation value based on whether a cooking recipe for which the registered amount of the ingredient is larger than the registered amount of the ingredient for another cooking recipe, and further based on whether the ingredient has a higher order in which the ingredient is listed among the two or more ingredients of the ingredient list.

* * * * *